United States Patent
Kang

(10) Patent No.: US 8,327,051 B2
(45) Date of Patent: Dec. 4, 2012

(54) PORTABLE HANDHELD MEMORY CARD AND METHODS FOR USE THEREWITH

(75) Inventor: Myeong Joon Kang, San Ramon, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 11/986,389

(22) Filed: Nov. 20, 2007

(65) Prior Publication Data

US 2009/0132739 A1     May 21, 2009

(51) Int. Cl.
*G06F 13/12*     (2006.01)
*G06F 13/38*     (2006.01)

(52) U.S. Cl. ........................................ 710/74

(58) Field of Classification Search ............. 710/74
See application file for complete search history.

(56) References Cited

U.S. PATENT DOCUMENTS

| | | | |
|---|---|---|---|
| 7,287,703 B2* | 10/2007 | Son et al. | 235/482 |
| 7,376,773 B2* | 5/2008 | Kim et al. | 710/74 |
| 7,433,994 B2* | 10/2008 | Petersen et al. | 711/103 |
| 7,491,076 B2* | 2/2009 | Gu et al. | 439/217 |
| 2002/0186842 A1* | 12/2002 | Sabet-Sharghi et al. | 380/200 |
| 2003/0212848 A1* | 11/2003 | Liu et al. | 710/305 |
| 2004/0083378 A1* | 4/2004 | LeRose | 713/193 |
| 2005/0063540 A1* | 3/2005 | Hsiung | 380/217 |
| 2006/0084287 A1* | 4/2006 | Miller et al. | 439/64 |
| 2006/0177064 A1* | 8/2006 | Holtzman et al. | 380/277 |
| 2008/0071940 A1* | 3/2008 | Kim et al. | 710/19 |

OTHER PUBLICATIONS

SanDisk Ultra II SD Plus Cards, http://www.sandisk.com/Products/Catalog(1096)-SanDisk_Ultra_II_SD_Plus_Cards.aspx, 1 page, printed Nov. 12, 2007.
New Rolling Stones Album, A Bigger Bang, Will Be Sold on New GRUVI Music Cards From Sandisk, http://www.sandisk.com/Corporate/PressRoom/PressReleases/PressRelease.aspx?ID=1751, 2 pages, Sep. 25, 2005.
SanDisk Receives CES Innovation Design Award for Its gruvi Rolling Stones Music Card, http://www.sandisk.com/Corporate/PressRoom/PressReleases/PressRelease.aspx?ID=3287, 2 pages, Jan. 31, 2006.

(Continued)

*Primary Examiner* — Henry Tsai
*Assistant Examiner* — Eric Oberly
(74) *Attorney, Agent, or Firm* — Brinks Hofer Gilson & Lione

(57) ABSTRACT

In one embodiment, a portable handheld memory card may include a Universal Serial Bus (USB) port, USB controller circuitry, an input/output (I/O) port, a memory, and decompression circuitry configured to decompress compressed data stored in the memory. The memory card includes a housing storing the memory and exposing the USB port and the I/O port. The USB port and I/O port may be positioned to allow a same card-insertion direction irrespective of whether a host device comprises a mating USB port or a mating I/O port. In another embodiment, the memory card includes decryption circuitry to decrypt encrypted data stored in the memory, a power management unit, a host interface module, and circuitry configured to control read and write operations to the memory. The I/O port may include a Secure Digital port, and the memory may include Flash memory. Other embodiments are provided, and each of the embodiments described herein can be used alone or in combination with one another.

27 Claims, 6 Drawing Sheets

OTHER PUBLICATIONS

SanDisk Sansa Express MP3 Players, http://www.sandisk.com/Products/Catalog(1226)-SanDisk_Sansa_Express_MP3_Players.aspx, 2 pages, printed Nov. 12, 2007.

SanDisk Cruzer Micro USB Flash Drive, http://www.sandisk.com/Products/Catalog(1168)-SanDisk_Cruzer_Micro_USB_Flash_Drive.aspx, 2 pages, printed Nov. 12, 2007.

* cited by examiner

PORTABLE HANDHELD MEMORY CARD AND METHODS FOR USE THEREWITH

TECHNICAL FIELD

The invention relates to memory devices, and particularly, to portable handheld memory cards configured to transfer data over various interfaces.

BACKGROUND

Memory devices may be used to expand the memory capacity of electronic devices. Such electronic devices may include audio players, video players, digital cameras, video cameras, personal digital assistants, cellular phones, and other devices. A memory device, such as a memory card, may interface with the electronic device using a standardized format, such as Secure Digital, CompactFlash, Memory Stick, or other formats. The memory device may also include other types of interfaces, such as a Universal Serial Bus port, which may be used to connect the memory device to a computer to transfer data, for example. The memory device may include Flash memory, magnetic disks, or other types of non-volatile media to store data. The data may include audio, video, or other types of data, and the data may be uncompressed or compressed. The data may also be encrypted and protected with digital rights management (DRM), which may allow content providers to control the use and transfer of the data. DRM technologies include proprietary encryption techniques, subscription models, Microsoft PlaysForSure, Windows Media DRM, Janus DRM, and other DRM technologies.

Existing memory cards have drawbacks that may reduce their usefulness. Encrypted data protected with DRM that is stored on existing memory cards may require authentication such that the data can only be used with a specific electronic device. For example, a song protected with DRM may be transferred with a specific audio player to a Secure Digital (SD) memory card. The DRM may restrict playback of the song such that the song can only be listened to when the SD memory card is connected to that specific audio player. Also, accessing or transferring data between existing memory cards and computers may require the use of a card reader connected to a computer via a USB connection. The card reader may translate the data transfer protocol of the memory card interface to the data transfer protocol of the USB connection. Using such a card reader may be inconvenient and costly. Furthermore, accessing compressed data stored on existing memory cards may require that the connected electronic device include decompression capability. For example, playing back a song compressed in the MP3 format that is stored on an existing memory card may require an audio player with MP3 decompression circuitry. Such a player may be expensive and complex.

SUMMARY

The present invention is defined by the following claims, and nothing in this section should be taken as a limitation on those claims.

By way of introduction, the embodiments described below provide a portable handheld memory card with a Universal Serial Bus (USB) port, USB controller circuitry, an input/output (I/O) port, a memory, and decompression circuitry configured to decompress compressed data stored in the memory. In one embodiment, the memory card includes a housing storing the memory and exposing the USB port and the I/O port. The USB port and I/O port may be positioned to allow a same card-insertion direction irrespective of whether a host device comprises a mating USB port or a mating I/O port. In another embodiment, the memory card includes decryption circuitry to decrypt encrypted data stored in the memory, a power management unit, a host interface module, and circuitry configured to control read and write operations to the memory. The I/O port may comprise a Secure Digital port, and the memory may comprise Flash memory.

Each of the embodiments described herein can be used alone or in combination with one another. The embodiments will now be described with reference to the attached drawings.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

By way of overview, the embodiments described herein are related to portable handheld memory cards with a Universal Serial Bus (USB) port, USB controller circuitry, an input/output (I/O) port, a memory, and decompression circuitry configured to decompress compressed data stored in the memory. The memory card may include a housing storing the memory and exposing the USB port and the I/O port. The USB port and I/O port may be positioned to allow a same card-insertion direction irrespective of whether a host device comprises a mating USB port or a mating I/O port. The memory card may include decryption circuitry to decrypt encrypted data stored in the memory, a power management unit, a host interface module, and circuitry configured to control read and write operations to the memory. The I/O port may comprise a Secure Digital port, and the memory may comprise Flash memory.

Figure 1:
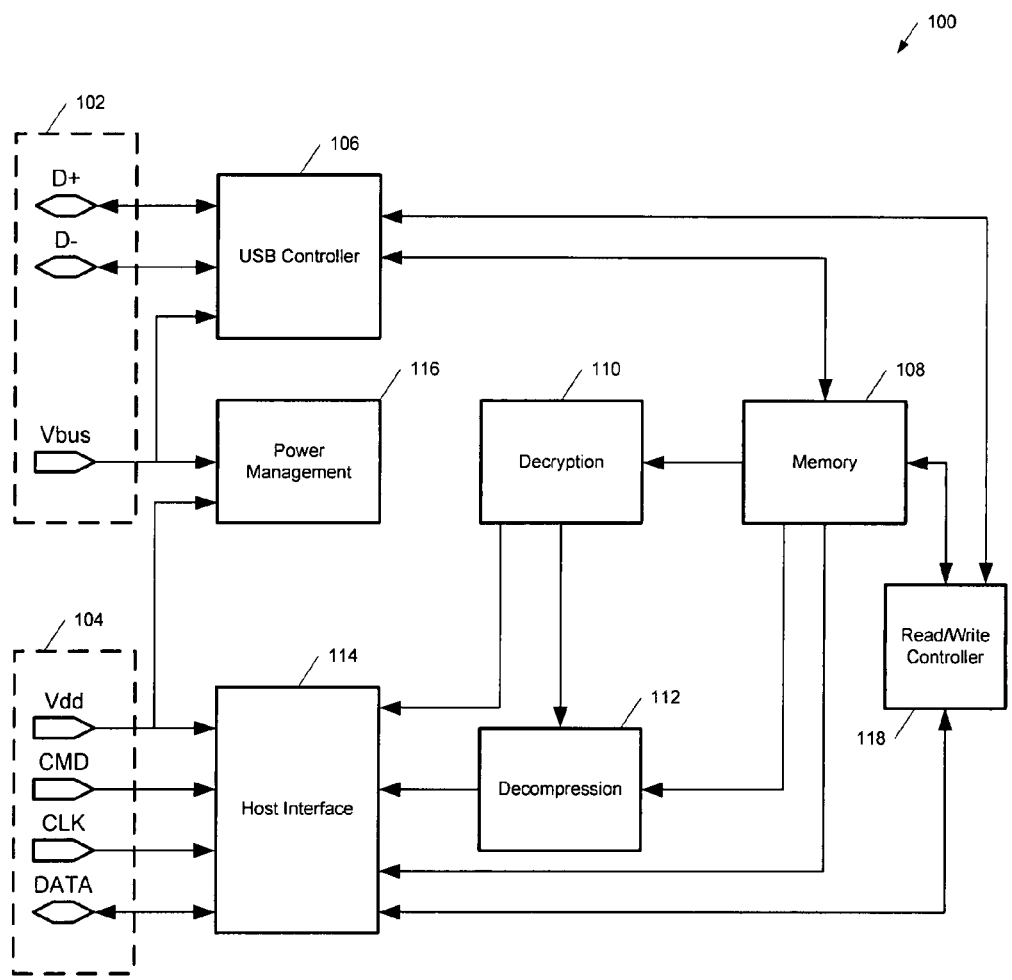
FIG. 1 is a block diagram of an embodiment of a memory card.

FIG. 1 is a block diagram of an embodiment of a memory card 100. The memory card 100 may include a USB port 102, a Secure Digital (SD) port 104, a USB controller circuit 106, a memory 108, a decryption circuit 110, a decompression circuit 112, a host interface circuit 114, a power management unit 116, and a read/write controller 118. More or fewer components may be included in the memory card 100. The memory card 100 may store and provide data that may be encrypted, unencrypted, compressed, and/or uncompressed. For example, the memory card 100 may store encrypted content protected with digital rights management (DRM).

Examples of encrypted content include data protected using proprietary encryption techniques, subscription models, Microsoft PlaysForSure, Windows Media DRM, Janus DRM, and other protection techniques. The memory card 100 may communicate via the USB port 102 or the Secure Digital port 104 to transfer data between the memory card 100 and external devices. The encrypted content may be transferred between the memory card 100 and a computer directly via the USB port 102. In addition, the encrypted content may be played back from the memory card 100 independent of the device it is connected to, such that authorization for use of the encrypted content takes place in the memory card 100. The memory card 100 may also decompress compressed data with the decompression circuit 112 so that a connected device does not need to include potentially costly and complex decompression circuitry. Examples of compressed data include MP3 audio data, and other types of lossy and lossless compressed data.

The memory 108 in the memory card 100 may include Flash memory, magnetic disks, or other suitable types of non-volatile memory. The memory 108 may store and provide encrypted, unencrypted, compressed, uncompressed, and other types of data. Data flow to and from the memory 108 may be managed by the read/write controller 118. The read/write controller 118 may be in communication with the USB controller 106 and the host interface 114 to control and coordinate read and write operations between the USB port 102 and Secure Digital port 104, respectively, and the memory 108. The read/write controller 118 may also perform error correction, wear leveling, address decoding, and other memory-related functions.

Data may be transferred between the memory 108 and an external device directly via the USB port 102. The USB port 102 may include serial data lines D+ and D− and a bus voltage Vbus, as shown in FIG. 1. The USB port 102 may be implemented with a standard USB connector, such as A-type, B-type, mini USB, and micro USB, and may include a USB connector such as on a Secure Digital Plus memory card. The USB port 102 may also be implemented using additional pins included on an existing memory card. The memory card housing may be configured such that the card may be inserted in the same direction irrespective of whether a host device includes a mating USB port or a mating Secure Digital port, as described below.

In the memory card 100, the data lines D+ and D− may be in communication with the USB controller 106, such that data transferred via the USB port 102 is translated to and from the USB protocol. Other components, such as a buffer, logic, or other circuitry may process the data between the USB port 102 and the memory 108. The USB controller 106 may allow the memory card 100 to be connected to a host USB device (not shown) such that data may be transferred via the USB port 102 and data lines D+ and D− using the USB protocol. A host USB device may include a computer, for example. The transferred data may be encrypted, unencrypted, compressed, and/or uncompressed data. If the data is encrypted, the data may be transferred such that use of the data is not restricted to any particular electronic device. In addition, the bus voltage Vbus may be in communication with the power management unit 116. The bus voltage Vbus may be approximately 5V, as specified in the USB standard, and may be converted by the power management unit 116 to a suitable voltage for use by components of the memory card 100.

The memory card 100 may also communicate with external devices using an input/output (I/O) port, such as the SD port 104. For example, the SD port 104 may transfer a pulse code modulated (PCM) signal containing music to an external audio player. The SD port 104 may include a voltage Vdd, a command line CMD, a clock line CLK, and a data bus DATA, all of which may be in communication with the host interface circuit 114. The host interface circuit 114 may translate data to and from the SD protocol to be transferred via the SD port 104, in particular, via the command line CMD, the clock line CLK, and the data bus DATA. The memory card 100 may operate in one of the transfer modes supported by the SD protocol: serial peripheral interface (SPI), one-bit SD mode, or four-bit SD mode. The voltage Vdd may be used by the host interface circuit 114 to translate the data to and from the SD protocol over the SD port 104. The voltage Vdd may also be in communication with the power management unit 116.

Data in the memory 108 that is accessed and transmitted over the SD port 104 may be encrypted, unencrypted, compressed, and/or uncompressed. If the data is uncompressed and unencrypted, the data may be read directly from the memory 108 to the host interface circuit 114 for output on the SD port 104. If the data is uncompressed and encrypted, the data may be read from the memory 108 to the decryption circuit 110. The decryption circuit 110 may then decrypt the data and transfer the data to the host interface circuit 114 for output on the SD port 104. If the data is compressed and unencrypted, the data may be read from the memory 108 to the decompression circuit 112. The decompression circuit 112 may decompress the data to a pulse code modulated (PCM) signal, which may then be transferred to the host interface circuit 114 to be transmitted over the SD port 104. Finally, if the data is compressed and encrypted, the data may be read from the memory 108 to the decryption circuit 110. The decryption circuit 110 may decrypt the data, and then transfer the decrypted compressed data to the decompression circuit 112. The decompression circuit 112 may decompress the decrypted compressed data to a PCM signal, and transfer the PCM signal to the host interface circuit 114 to be transmitted over the SD port 104.

Figure 2:
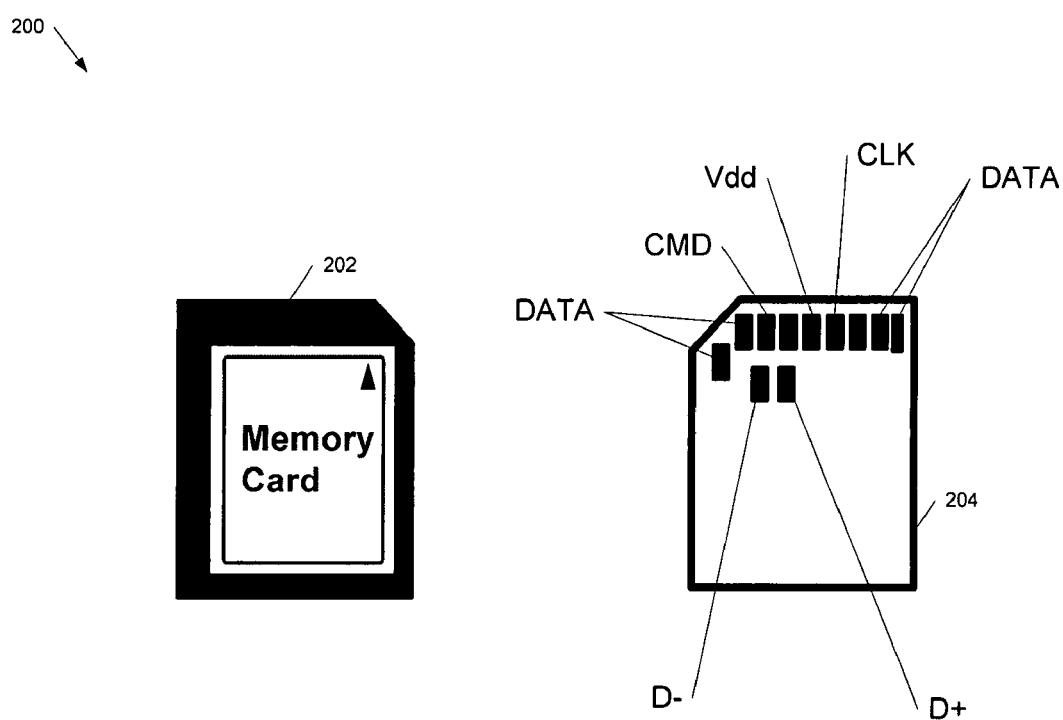
FIG. 2 is a schematic of an exemplary pinout of an embodiment of a memory card.

FIG. 2 is a schematic of an exemplary pinout of an embodiment of a memory card 200. The memory card 200 may have a physical form factor and housing that complies with the Secure Digital standard, as shown in FIG. 2 with a view of the front 202 and the rear 204 of the memory card 200. The memory card 200 may include any memory capacity and may store music or any other type of data. The rear 204 of the memory card 200 may include pins as specified by the Secure Digital standard. For example, the SD port shown in FIG. 2 is for the four-bit SD transfer mode, including pins for the voltage Vdd, the command line CMD, the clock line CLK, and the data bus DATA. The SD port of the memory card 200 may be assigned different functions if a different SD transfer mode is used, such as serial peripheral interface (SPI) or one-bit SD mode. The memory card 200 is configured such that it may be inserted in a certain direction and orientation so that the SD port interfaces with a mating SD port of a host device. In particular, the housing of the memory card 200 exposes the SD port. When the memory card 200 is inserted into a host device, the mating SD port of the host device is electrically connected to the SD port of the memory card 200.

The memory card 200 may also include additional pins as specified by the USB standard. For example, the USB port shown in FIG. 2 includes serial data pins D+ and D−. As described above, the memory card 200 is configured to be inserted in a certain direction and orientation so that the SD port interfaces with a mating SD port of a host device. When the memory card 200 is inserted in this fashion, the USB port may also interface with a mating USB port of the host device. In particular, the housing of the memory card 200 exposes the USB port. When the memory card 200 is inserted into a host device, the mating USB port of the host device is electrically connected to the USB port of the memory card 200. Therefore, when the memory card 200 is inserted into a host device, the SD port and/or the USB port of the memory card 200 may be electrically connected to a mating SD port and/or a mating USB port of the host device, respectively. The host device may include a mating SD port, a mating USB port, and/or other types of mating ports.

Figure 3:
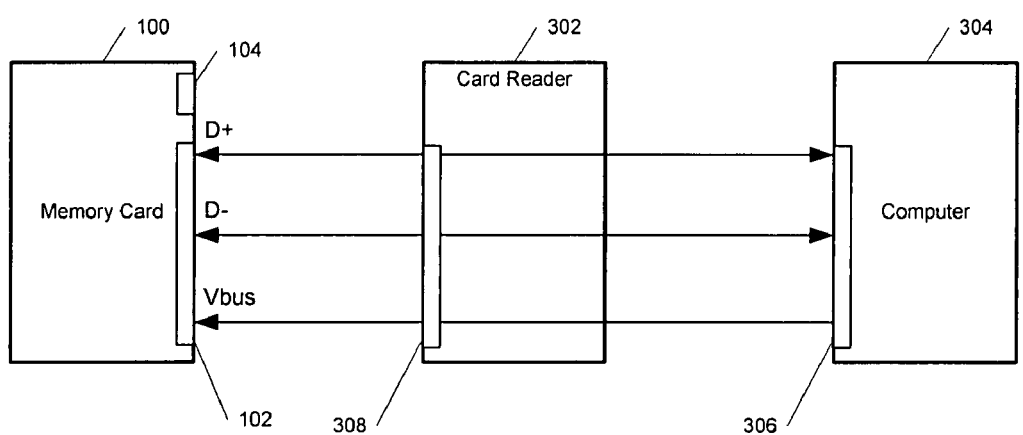
FIG. 3 is a block diagram of the memory card of FIG. 1 interfaced with a card reader and a computer, via a Universal Serial Bus port.

FIG. 3 is a block diagram of the memory card 100 of FIG. 1 interfaced with a card reader 302 and a computer 304, via a Universal Serial Bus port 102. In FIG. 3, data may be transferred between the computer 304 and the memory card 100 using the USB protocol, and using the card reader 302 as a host device. A memory card 100 may be inserted in a certain direction and orientation into the card reader 302 such that the SD port 104 would interface with a mating SD port. However, in FIG. 3, the card reader 302 does not include a mating SD port. Instead, the USB port 102 of the memory card 100 may connect to a mating USB port 308 of the card reader 302. The USB port 102 may include the USB pins D+, D−, and Vbus. The computer 304 may include a USB host interface 306 to translate data to and from the USB protocol. The computer 304 may be connected to the card reader 302 via a standard USB connector, such as A-type, B-type, mini USB, and micro USB.

The memory card 100 may be connected to the card reader 302 and transfer data over the USB port 102 using the USB protocol, instead of using the SD port 104. When the memory card 100 is inserted into the card reader 302, there may be no electrical connection to the SD port 104 of the memory card 100 and only an electrical connection to the USB port 102 of the memory card 100 via the mating USB port 308 of the card reader 302. Because the memory card 100 may include the USB controller 106, the card reader 302 does not need to translate data to and from the USB protocol. Instead, the USB controller 106 on the memory card 100 translates data to and from the USB protocol. Data may be transferred between the USB port 102 of the memory card 100 and the USB host interface 306 of the computer 304, via the mating USB port 308 of the card reader 302.

Figure 4:
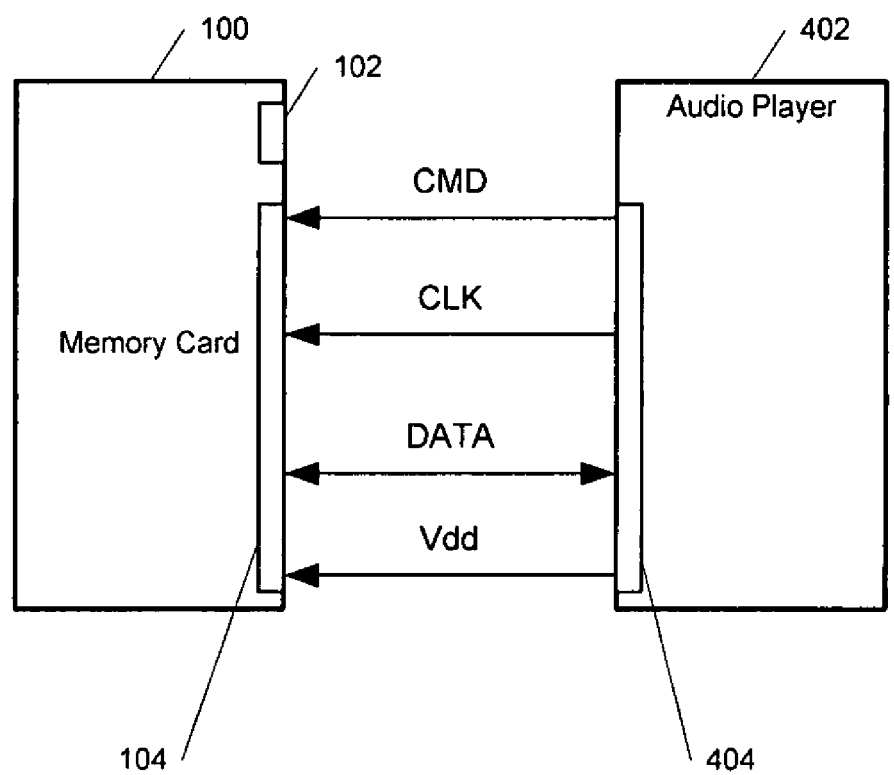
FIG. 4 is a block diagram of the memory card of FIG. 1 interfaced with an audio player via a Secure Digital port.

FIG. 4 is a block diagram of the memory card 100 of FIG. 1 interfaced with an audio player 402 via a Secure Digital port 104. In FIG. 4, data may be transferred between the audio player 402 and the memory card 100 using the SD protocol, using the pins CMD, CLK, DATA, and Vdd. The memory card 100 may be inserted in a certain direction and orientation into the audio player 402 such that the SD port 104 interfaces with a mating SD port 404 of the audio player 402. The mating SD port 404 may be electrically connected to the SD port 104 of the memory card 100. In this case, the USB port 102 of the memory card 100 is not electrically connected.

As described above, the data transferred between the audio player 402 and the memory card 100 may include signals generated by the decryption circuit 110 and the decompression circuit 112. For example, a PCM signal may be generated by the decryption circuit 110 and/or the decompression circuit 112, and be output on the SD port 104. The mating SD port 404 of the audio player 402 may receive the PCM signal from the memory card 100. The digital PCM signal may be converted to an analog signal for audio playback using a digital-to-analog converter or other suitable circuitry. The audio player 402 may also include other components such as a display for showing a title, artist, album, or other information. However, the audio player 402 does not need to include decompression or decryption circuitry because the memory card 100 may already include the decryption circuit 110 and the decompression circuit 112.

Figure 5:
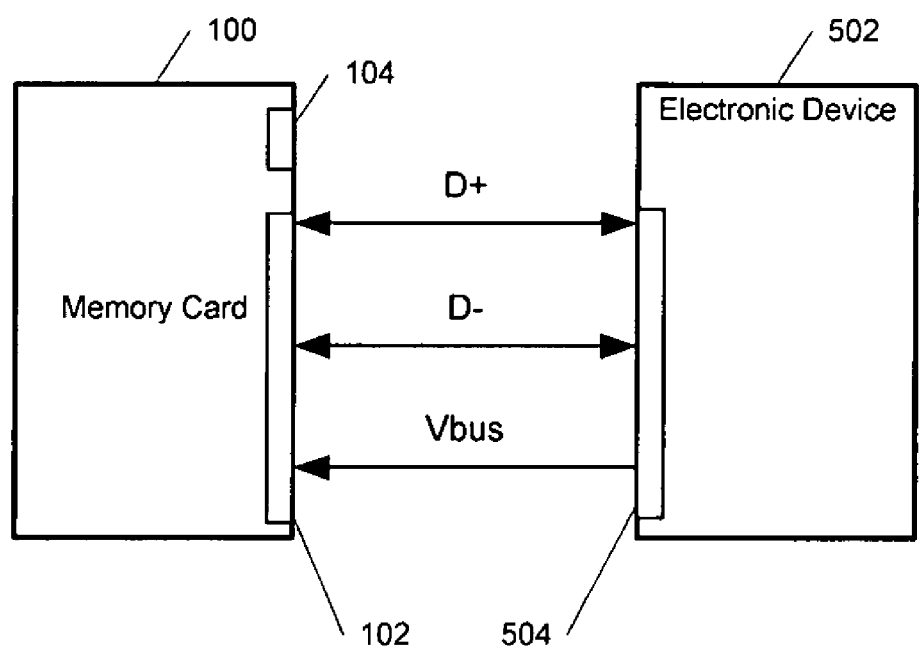
FIG. 5 is a block diagram of the memory card of FIG. 1 interfaced with an electronic device via a Universal Serial Bus port.

FIG. 5 is a block diagram of the memory card 100 of FIG. 1 interfaced with an electronic device 502 via a Universal Serial Bus port 102. In FIG. 5, data may be transferred between the electronic device 502 and the memory card 100 using the USB protocol. The electronic device 502 may include a mating USB port 504 which may be directly connected to the USB port 102 via a standard USB connector, such as A-type, B-type, mini USB, and micro USB. The memory card 100 may include a Secure Digital Plus card, a USB flash drive, or other suitable memory device that can connect to the electronic device 502 via the USB port 102. The USB port 102, including USB pins D+, D−, and Vbus, may be exposed by the housing of the memory card 100. The memory card 100 may be configured to be inserted in a certain direction and orientation so that the SD port 104 would interface with a mating SD port. However, in FIG. 5, the electronic device 502 does not include a mating SD port. Instead, the USB port 102 of the memory card 100 may connect to a mating USB port 504 of the electronic device 502. Data may be transferred between the USB port 102 of the memory card 100 and the mating USB port 504 of the electronic device 502.

Figure 6:
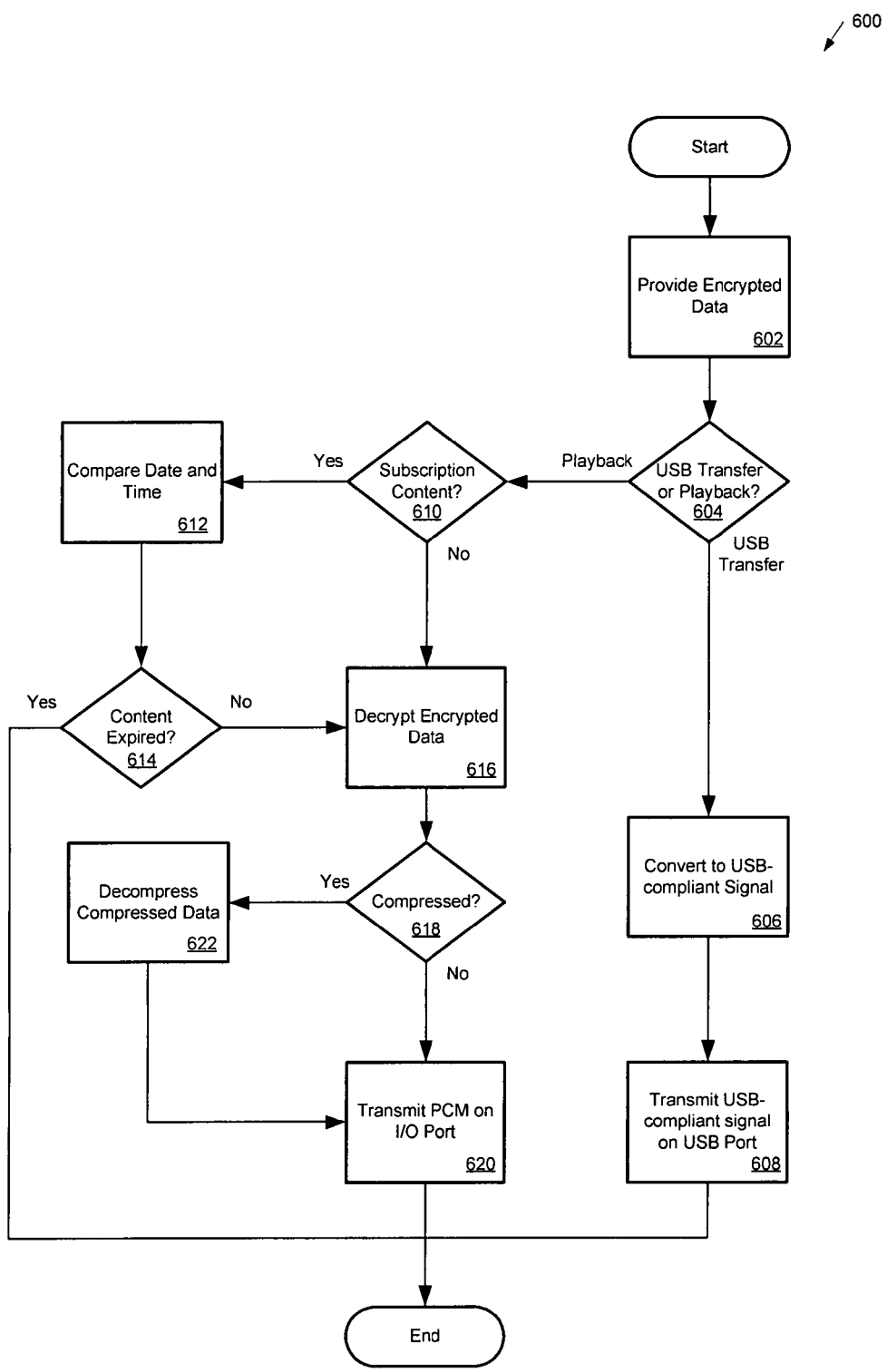
FIG. 6 is a flowchart illustrating a method of an embodiment of the memory card.

FIG. 6 is a flowchart illustrating a method 600 of an embodiment of the memory card 100. In FIG. 6, encrypted data may be provided in Act 602. The encrypted data may be stored in the memory 108, such as a flash memory, magnetic disks, or other suitable non-volatile storage medium. In Act 604, it is determined whether the encrypted data is being transferred via the USB port or is being played back. If the encrypted data is being transferred via the USB port, the method 600 continues to Act 606. In Act 606, the encrypted data may be converted to a USB-compliant signal using, for example, the USB controller circuit 106. In Act 608, the USB-compliant signal may be transmitted on the USB port 102. The USB port 102 may include D+, D−, and Vbus pins, and the transmission may be at any data rate supported by the USB standard, including low speed (1.5 Mbit/s), full speed (12 Mbit/s), and hi-speed (480 Mbit/s). Once the encrypted data is transmitted, the method 600 is complete.

If it is determined that the encrypted data is being played back in Act 604, the method 600 continues to Act 610. In Act 610, the method 600 checks if the encrypted data contains content based on a subscription model. Subscription content may include data that is usable only when a subscriber pays a monthly fee, for example, and expires if the subscription is not maintained. If the encrypted data includes subscription content, the method 600 continues to Act 612 to compare the current date and time to the expiration date and time of the encrypted data. The current date and time may be obtained from an external device connected to the memory card 100. The expiration date and time of the encrypted data may be stored in the memory 108 on the memory card 100, and may be updated when the encrypted data is initially stored on the memory card 100 and/or when the subscription for the encrypted data is extended. The subscription content may be expired, for example, if the current date and time is later than the expiration date and time. If the content is expired in Act 614, then the method 600 is complete. If the subscription content is not expired, for example, when the current date and time is not later than the expiration date and time, then the method 600 continues to Act 616. The method 600 also continues to Act 616 from Act 610 if the encrypted data does not include subscription content.

In Act 616, the encrypted data may be decrypted to decrypted data by suitable circuitry, such as the decryption circuit 110 described above. The encrypted data may be protected with digital rights management, including data protected using proprietary encryption techniques, subscription models, Microsoft PlaysForSure, Windows Media DRM, Janus DRM, and other protection techniques. In Act 618, the method 600 determines whether the decrypted data is compressed. If the decrypted data is not compressed, the method 600 may continue to Act 620, where pulse code modulated (PCM) data may be transmitted on an I/O port, such as the Secure Digital port 104. The PCM data may be generated by the host interface circuit 114 from the decrypted data. On the other hand, if the decrypted data is compressed, then the method 600 continues to Act 622 to decompress the decrypted data with the decompression circuit 112. The data may be compressed using the MP3 audio format, or with other forms of lossy and lossless compression. The decompression in Act 622 may generate PCM data, which may be transmitted on the I/O port in Act 620, such as on the Secure Digital port 104. Once the PCM data is transmitted, the method 600 is complete.

All of the discussion above, regardless of the particular implementation being described, is exemplary in nature, rather than limiting. Although specific components of the portable handheld memory card are described, methods, systems, and articles of manufacture consistent with the portable handheld memory card may include additional or different components. For example, components of the portable handheld memory card may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the portable handheld memory card may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the portable handheld memory card may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A portable handheld memory card comprising:
    a Universal Serial Bus (USB) port comprising a first set of pins;
    USB controller circuitry electrically connected with the first set of pins of the USB port;
    an input/output (I/O) port comprising a second set of pins;
    I/O controller circuitry electrically connected with the second set of pins of the I/O port;
    a memory in communication with the USB port and the I/O port; and
    a housing storing the memory and exposing the USB port and the I/O port;
    wherein the USB port and the I/O port are positioned on a same end to allow a same card-insertion direction irrespective of whether a host device comprises a mating USB port or a mating I/O port; and
    wherein the USB port and the I/O port are positioned such that when the I/O port is electrically connected with the host device, at least one of the first set of pins of the USB port is not electrically connected to the host device, and when the USB port is electrically connected to the host device, at least one of the second set of pins of the I/O port is not electrically connected to the host device.

2. The portable handheld memory card of claim 1 further comprising:
    decryption circuitry in communication with the memory and configured to decrypt encrypted data stored in the memory.

3. The portable handheld memory card of claim 1 further comprising:
    decompression circuitry configured to decompress compressed data stored in the memory.

4. The portable handheld memory card of claim 1 further comprising:
    a power management unit in communication with the USB controller circuitry.

5. The portable handheld memory card of claim 1 further comprising:
    a host interface module in communication with the I/O port.

6. The portable handheld memory card of claim 1 further comprising:
    circuitry configured to control read and write operations to the memory.

7. The portable handheld memory card of claim 1, wherein the I/O port comprises a Secure Digital port.

8. The portable handheld memory card of claim 1, wherein the memory comprises Flash memory.

9. A method comprising:
    with a portable handheld card comprising a Universal Serial Bus (USB) port comprising a first set of pins; USB controller circuitry electrically connected with the first set of pins of the USB port; an input/output (I/O) port comprising a second set of pins; I/O controller circuitry electrically connected with the second set of pins of the I/O port; a memory in communication with the USB port and the I/O port; and a housing storing the memory and exposing the USB port and the I/O port, wherein the USB port and the I/O port are positioned to allow a same card-insertion direction irrespective of whether a host device comprises a mating USB port or a mating I/O port and wherein the USB port and the I/O port are positioned such that when the I/O port is electrically connected with the host device, at least one of the first set of pins of the USB port is not electrically connected to the host device, and when the USB port is electrically connected to the host device, at least one of the second set of pins of the I/O port is not electrically connected to the host device:
    reading compressed data from the memory
    decompressing the compressed data to decompressed data;
    transmitting the decompressed data on the I/O port;

converting the compressed data to first converted data for transmission on the USB port; and transmitting the first converted data on the USB port.

10. The method of claim 9 further comprising:

reading encrypted data from the memory;

decrypting the encrypted data to decrypted data; and transmitting the decrypted data on the I/O port.

11. The method of claim 9 further comprising:

converting a first voltage of the USB port to a second voltage of the portable handheld memory card.

12. The method of claim 9 further comprising:

converting the decompressed data to second converted data for transmission on the I/O port; and transmitting the second converted data on the I/O port.

13. The method of claim 9 further comprising: controlling reading and writing to the memory.

14. The method of claim 9, wherein the I/O port comprises a Secure Digital port.

15. The method of claim 9, wherein the memory comprises Flash memory.

16. A method comprising:

with a portable handheld card comprising a Universal Serial Bus (USB) port comprising a first set of pins; USB controller circuitry electrically connected with the first set of pins of the USB port; an input/output (I/O) port comprising a second set of pins; I/O controller circuitry electrically connected with the second set of pins of the I/O port; a memory in communication with the USB port and the I/O port; and a housing storing the memory and exposing the USB port and the I/O port, wherein the USB port and the I/O port are positioned to allow a same card-insertion direction irrespective of whether a host device comprises a mating USB port or a mating I/O port and wherein the USB port and the I/O port are positioned such that when the I/O port is electrically connected with the host device, at least one of the first set of pins of the USB port is not electrically connected to the host device, and when the USB port is electrically connected to the host device, at least one of the second set of pins of the I/O port is not electrically connected to the host device:

reading data from the memory;

determining whether the data is to be transmitted via the USB port or I/O port; and transmitting the data to the host device via the determined port.

17. The method of claim 16, wherein the data is encrypted data, and wherein the method further comprises:

decrypting the encrypted data to decrypted data.

18. The method of claim 16, wherein the data is compressed data, and wherein the method further comprises:

decompressing the compressed data to decompressed data.

19. The method of claim 18 further comprising:

converting the decompressed data to second converted data for transmission.

20. The method of claim 16, wherein the I/O port comprises a Secure Digital port.

21. The method of claim 16, wherein the memory comprises Flash memory.

22. The method of claim 18 further comprising:

converting the compressed data to first converted data for transmission.

23. The portable handheld memory card of claim 1, wherein at least two pins of the USB port are parallel to at least two pins of the I/O port.

24. The portable handheld memory card of claim 1, wherein layout for the USB port is different from layout of the I/O port.

25. The portable handheld memory card of claim 24, wherein the I/O port is configured for mating with an external port.

26. The portable handheld memory card of claim 1, wherein all of the first set of pins electrically connected with the USB controller circuitry is not electrically connected to the I/O controller circuitry.

27. The portable handheld memory card of claim 1, wherein the USB port comprises multiple data lines;

wherein the first set of pins comprise multiple data pins connected to the multiple data lines; and wherein all of the multiple data pins are not electrically connected to the I/O controller circuitry.

* * * * *